Sept. 10, 1940.     O. L. ROBERTS     2,213,996
RECOVERY OF LIQUID FROM HYDROCARBON GASES
Filed Oct. 31, 1939
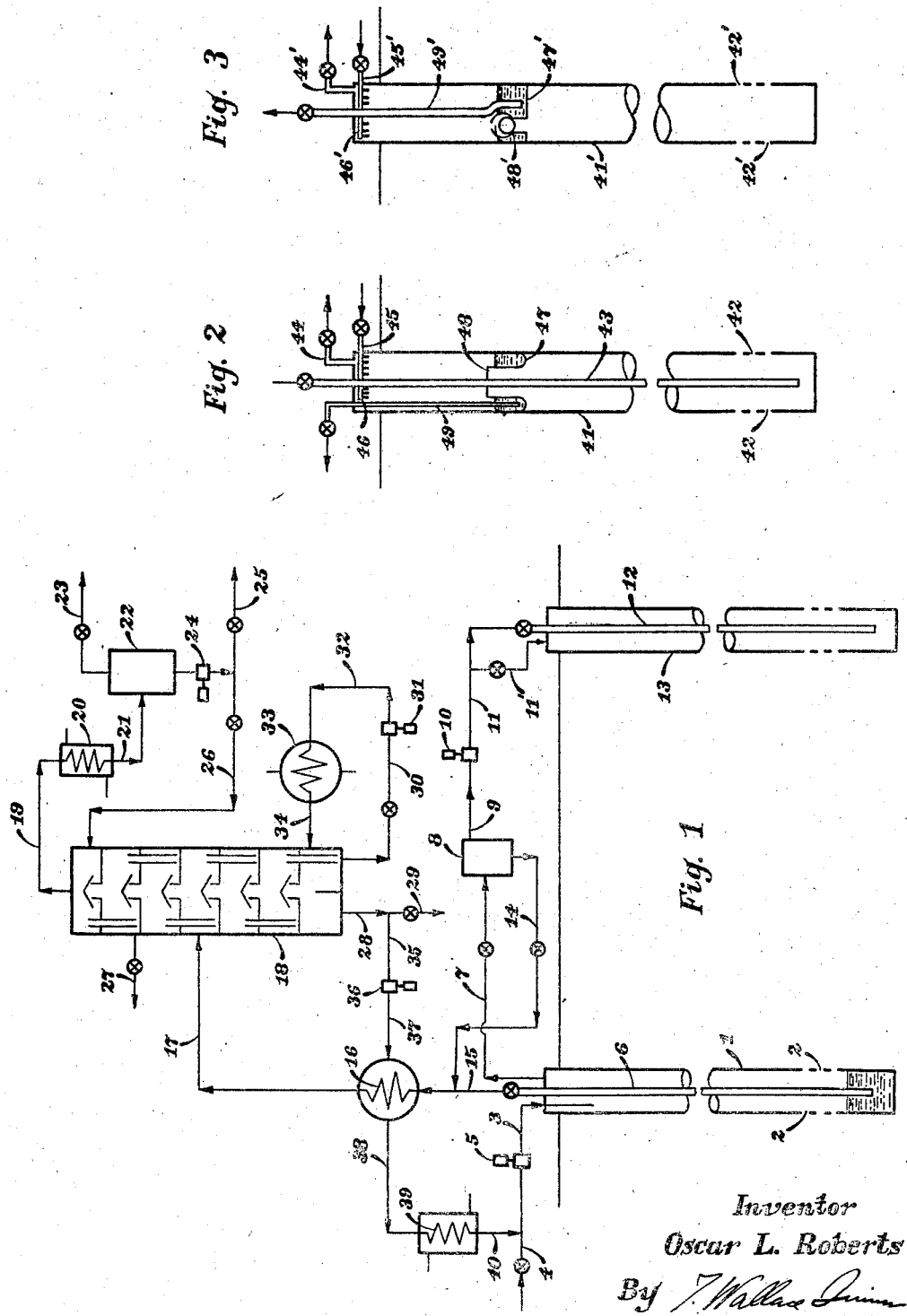
Inventor
Oscar L. Roberts
By T. Wallace Quinn
his Attorney Patented Sept. 10, 1940

2,213,996

UNITED STATES PATENT OFFICE 2,213,996

RECOVERY OF LIQUID FROM HYDROCARBON GASES

Oscar L. Roberts, Drexel Hill, Pa., assignor to The Atlantic Refining Company, Philadelphia, Pa., a corporation of Pennsylvania Application October 31, 1939, Serial No. 302,263

5 Claims. (Cl. 166—21)

The present invention relates to a process of recovering gasoline constituents from gases, and relates more particularly to a process of recovering hydrocarbons boiling substantially within the gasoline boiling range from gases occurring in high pressure wells of the gas distillate type.

A principal object of this invention is to recover gasoline constituents from gas initially at relatively high pressure without dissipating more than a minimum amount of the pressure energy initially present in the gas.

A further object of this invention is to recover gasoline constituents from gas by treatment thereof at pressures of the order of those prevailing in the well.

This invention further contemplates the treatment of gas occurring in gas distillate wells to recover therefrom gasoline hydrocarbons, while maintaining the gas at elevated pressures of the order of the well pressure, in order that the residue gas from the process may be available at pressures sufficiently high to permit its use for repressuring oil or gas sands without the expenditure of an excessive amount of energy in recompression necessary to return the gas to the sands.

Wells of the gas distillate type, flowing at pressures in excess of 2000 lbs./sq. in., and generally at pressures of the order of 3000–4500 lbs./sq. in., produce gas (mostly methane) containing an appreciable quantity of liquefiable hydrocarbons. Gases produced from gas distillate wells may yield from about 25 to about 40 barrels per million cubic feet of gas, of hydrocarbons having a boiling range of the order of 90 F. to 650° F. Of this hydrocarbon mixture, approximately 80% may boil within the gasoline boiling range, i. e., 90° F. to 400° F. It is therefore economically feasible to recover such hydrocarbons, provided the cost of recompression and return of residual or lean gas to the gas-producing formation is relatively low.

Heretofore the recovery of gasoline constituents from high pressure gases was accomplished in the conventional manner by reducing the pressure of the gases to a relatively low pressure, for example, 25% to 30% of the initial pressure, and absorbing the desired gasoline constituents in a suitable absorption medium under the low pressure aforesaid. Or, in lieu of a low pressure absorption system, recovery of gasoline constituents from the gases has been accomplished by a process involving retrograde condensation, wherein by cooling and partial release of pressure, gasoline constituents are condensed from the gases and recovered as a liquid hydrocarbon mixture. In the retrograde condensation system, as employed in connection with gas wells producing at pressures of the order of 1500 to 3500 lbs./sq. in., the pressure of the gases undergoing treatment is reduced to a value of the order of 40% to 70% of the initial pressure of the gases withdrawn from the well. Furthermore, in the operation of the retrograde condensation system, careful control of both the temperature and the pressure is necessary in order to effect economic recovery of gasoline constituents from said gases. And, since the most effective recovery by means of retrograde condensation is accomplished at temperatures within the range of from −5° F. to +60° F., the moisture content of the gases must be controlled in order to prevent the formation of solid gas hydrates which accumulate in lines and valves, and tend to impair or prevent satisfactory operation of the recovery system.

Such conventional methods, as above outlined, necessitated the dissipation of a relatively large proportion of the initial pressure energy of the gas, which energy would otherwise be useful for various purposes, and particularly where it is desired to return the residual or lean gas to an oil or gas-producing formation for repressuring such formation. Furthermore, in reducing the pressure of the gas from the comparatively high pressure at which it is available at the gas distillate well to the relatively lower pressures necessitated when processing the gas by conventional methods, great increases in volume of the gas results, requiring equipment of proportionately increased size for the handling thereof.

I have found that the disadvantages inherent in the recovery processes practiced heretofore may be overcome to substantial extent by employing an absorption system operated under high pressure, i. e., the pressure existing in the well.

Briefly, my invention comprises introducing an absorption medium, for example, hydrocarbon oil, into a gas distillate well and causing such medium to flow downwardly through the well in intimate countercurrent contact with the upwardly flowing well gases, thereby effecting absorption in said medium of a substantial proportion of the gasoline constituents contained in said gases. The gases, thus denuded of their content of gasoline constituents, are withdrawn from the well without substantial loss of pressure, recompressed to a pressure slightly above well head pressure, and returned to the gas-producing formation through an adjacent well. The absorption medium containing absorbed gasoline constituents is withdrawn from the well, the gasoline constituents are separated therefrom, and the absorption medium is returned to the well for contacting additional quantities of gas.

My invention may be further illustrated with reference to the accompanying drawing, wherein:

Figure 1 shows diagrammatically a system suitable for carrying out my process, and Figures 2 and 3 show modifications of my apparatus for effecting contact of gases with absorption medium in the well.

Referring to the drawing, gases at high pressure, for example, of the order of 3500 lbs./sq. in., and containing an appreciable quantity of hydrocarbons boiling within the range of from about 90° F. to about 650° F. (hereinafter termed "gasoline constituents"), flow from the gas-producing formation into the well casing 1 through a plurality of perforations 2 in the casing adjacent the bottom thereof. Such gases pass upwardly through casing 1, in intimate countercurrent contact with a descending flow of absorption medium, such as hydrocarbon oil, introduced at the top of casing 1 by means of pipe 3. The absorption oil may be supplied from storage (not shown) by means of valve-controlled pipe 4, or such oil may constitute that which is recycled from my gasoline-recovery system hereinafter to be described. In either case, the absorption oil is introduced into the casing 1 by means of pump 5 and pipe 3 under a pressure somewhat above that prevailing at the well head. The oil is preferably distributed over the inner surface of the casing 1 and/or the outer surface of tubing 6 in such a manner as to form a thin film, thereby presenting a large surface for contact with the upwardly flowing gases. During the counter flow of oil and gases, a substantial proportion of the content of gasoline constituents of the gases is absorbed by the oil. The thus enriched oil collects in the bottom of the well casing 1 and is withdrawn therefrom by means of tubing 6, the gas pressure within the well usually being sufficient to force the oil through the tubing to the surface of the ground. The "lean" gases, denuded of gasoline constituents, are withdrawn from the upper end of casing 1, at high pressures, and are passed by means of valve-controlled pipe 7 into separator 8, wherein entrained absorption oil or entrained gasoline constituents are separated from the gases. The lean gases are thereafter passed from separator 8 through pipe 9 to compressor 10, recompressed to a pressure slightly higher than that prevailing at the well head, and returned to the gas-producing formation by pipe 11, and pipe 11', or tubing 12 of an adjacent well 13. Since the pressure drop of the gases is comparatively small, i. e., 100 to 300 lbs./sq. in., recompression is minimized, with consequent economies in the cost of returning the lean gases to the gas-producing formation. For example, gases may be withdrawn from the top of casing 1 at a pressure of 3000 lbs./sq. in., passed through pipe 7, separator 8 and pipe 9, and arrive at compressor 10 at a pressure of 2800 lbs./sq. in. Such gases would then be recompressed to about 3200 lbs./sq. in. and returned to the gas-producing formation through the adjacent well 13.

Entrained absorption oil and/or gasoline constituents separated from the lean gases in separator 8 may be withdrawn therefrom by means of valve-controlled pipe 14 and introduced into the stream of enriched absorption oil passing from the well tubing 6 through pipe 15 into heat exchanger 16. In heat exchanger 16 the enriched absorption oil is brought to a temperature of, for example, 360° F., by indirect heat exchange with hot recycle absorption oil, and is thereafter introduced by means of pipe 17 into fractionating column 18.

In the fractionating column 18 the gasoline constituents are separated from the absorption oil and passed as vapors at a temperature of, for example, 350° F., from the top of the column through pipe 19 to condenser 20, wherein such vapors are condensed to liquid. The liquid condensate, together with any uncondensable gas, is passed by pipe 21 to separator 22, wherein the liquid condensate (gasoline constituents) is separated from the gas. Such gas may be vented from the top of the separator by means of valve-controlled pipe 23, while the liquid constituents may be withdrawn from the bottom of said separator and delivered to storage (not shown) by means of pump 24 and valve-controlled pipe 25. A portion of the liquid condensate from separator 22 may be recycled through valve-controlled pipe 26 to the top of fractionating column 18 to function therein as reflux. It is to be understood that the gasoline constituents recovered from the absorption oil may include hydrocarbons boiling somewhat higher than those normally included in specification gasoline, i. e., the recovered gasoline constituents may have a boiling range of from about 90° F. to about 650° F. However, if desired, the recovered constituents may be fractionated to produce gasoline having a boiling range of, for example, 90° F. to 400° F., the heavier hydrocarbons or "ends" either being removed as a side stream from column 18 by means of valve-controlled pipe 27, or permitted to accumulate in the absorption oil, portions of which may be bled from the system from time to time, through pipe 28 and valve-controlled pipe 29.

The absorption oil, upon reaching the bottom of fractionating column 18, may contain a relatively small proportion of gasoline constituents. To further remove gasoline constituents retained in the absorption oil and to supply additional heat to the fractionating column, a portion of said oil, at a temperature of, for example, 540° F., is withdrawn from the bottom of the column and is passed through valve-controlled pipe 30 to pump 31 and pumped through pipe 32 to heat exchanger 33, wherein the temperature of the oil is raised, for example, to about 600° F. The heated oil is then delivered from exchanger 33 by means of pipe 34 to the lower section of column 18, wherein the vaporized residual gasoline constituents are separated from the absorption oil.

The remaining portion of absorption oil withdrawn from the bottom of column 18 at a temperature of, for example, 540° F., is passed through pipes 28 and 35 to pump 36, and pumped through pipe 37 to the shell of the heat exchanger 16 wherein such oil is relieved of substantial of its heat content by indirect heat exchange with absorption oil containing gasoline constituents being passed from the well tubing 6 to fractionating column 18. The thus partially cooled recycle absorption oil is then passed through pipe 38, cooler 39, pipe 40, and pipe 4 to pump 5, which delivers said recycle oil through line 3 to the top of the well casing 1 at a pressure in excess of the well head pressure. The recycle absorption oil may thus be repeatedly employed for contacting additional quantities of gases within the well.

In Figures 2 and 3 of the drawing, there are shown modifications of my apparatus for effecting contact of the gases with the absorption medium in the well. These modifications are particularly adapted for use in wells of great depth, where the gas pressure is insufficient to force the absorption medium from the bottom of the well to the earth's surface.

Referring to Figure 2, the well casing 41 is provided adjacent its lower end with a plurality of perforations 42 for admitting high pressure gases from the gas-producing formation. The casing 41 is further provided with a tubing string 43 and a valve-controlled lean gas drawoff pipe 44. Adjacent the top of the casing 41 is disposed a valve-controlled pipe 45 terminating in a perforated member 46 arranged within the top of the casing 41 to distribute absorption medium, such as oil, over the inner surface of the casing. Within the casing 41, suitably spaced from the top thereof, for example, 500 to 1000 feet below the earth's surface, is affixed a circular trough or gutter 47 adapted to collect enriched absorption oil flowing downwardly over the inner surface of the casing. Inwardly of the gutter 47 is an opening 48 to accommodate tubing string 43 and to permit passage of gas upwardly through the casing. Extending downwardly within the casing 41 and terminating adjacent the bottom of gutter 47 is valve-controlled pipe 49 for withdrawing enriched absorption oil from the casing.

In operation, absorption oil is pumped through valve-controlled pipe 45 and distributing member 46 onto the inner walls of casing 41, and flows downwardly in a thin film in intimate countercurrent contact with gases passing upwardly through opening 48 in the casing gutter 47. During such period of contact the gasoline constituents are absorbed by the absorption oil and thus removed from the gases, the enriched oil collecting in the gutter 47 being forced to the surface of the earth through pipe 49 by means of the gas pressure prevailing in the well. Lean gases, denuded of their gasoline constituents, are withdrawn from the top of the casing through valve-controlled pipe 44, and eventually returned to the gas-producing formation via an adjacent well. Enriched absorption oil withdrawn from the casing gutter is subjected to fractionation for separation of absorbed gasoline constituents, and the recovered absorption oil is returned to the casing through pipe 45 for contacting additional quantities of gas. By operating in this manner, it is unnecessary to flow the absorption oil to the very bottom of the well, thereby avoiding the lifting of a long column of enriched oil through the tubing 43 to the surface. This is particularly advantageous when recovering gasoline constituents from gas wells producing at great depths, for example, 7000 to 10,000 feet, in which case the gas pressure may be insufficient to force enriched absorption oil from the bottom of the well to the earth's surface.

In Figure 3 is shown a further modification of an apparatus for effecting contact of gases with the absorption medium, such as oil, in the well. In accordance with this modification, the well casing 41' is provided, at a suitable depth, with a diaphragm or tray 47' carrying a check valve 48', said diaphragm being so constructed as to prevent absorption oil from descending into the well below the diaphragm while permitting gases entering casing 41' through perforations 42' to pass upwardly through the check valve, in countercurrent contact with a descending flow of absorption oil introduced into the top of the casing through valve-controlled pipe 45' and distributing member 46'. The oil, in flowing downwardly over the surface of the casing 41', absorbs gasoline constituents from the gases, and the thus enriched oil collecting on the diaphragm 47' is forced to the surface of the earth through valve-controlled pipe 49' by the gas pressure prevailing in the well. The gasoline constituents may then be separated from the absorption oil by distillation, as hereinbefore described. Lean gases, denuded of their gasoline constituents may be withdrawn from the top of casing 41' by means of valve-controlled pipe 44', and subsequently returned to the gas-producing formation through an adjacent well.

The absorption medium to be employed in my high pressure absorption system may be a hydrocarbon oil such as crude oil, reduced crude, gas oil, lubricating oil distillate, or the heavy "ends" or residue obtained in the fractional distillation of the gasoline components recovered from the well gases. Preferably the absorption oil is one which is relatively stable against sludge formation and which has a boiling range sufficiently above that of the gasoline constituents to be recovered as to permit separation therefrom by fractional distillation.

My process of recovering gasoline constituents from gases occurring in high pressure wells of the gas distillate type possesses several outstanding advantages over the recovery processes employed heretofore, namely, (1) avoidance of construction and operation of a high pressure absorption tower above ground, (2) relatively small loss in pressure throughout the recovery system, with consequent low recompression costs, (3) avoidance of the necessity for close control of temperatures in the absorption operation, since absorption is carried on within the well at temperatures prevailing in the well, i. e., 100° F. to 180° F., and (4) use of operating temperatures sufficiently high (well temperature) to prevent the formation of solid gas hydrates, thereby avoiding the necessity for controlling the moisture content of the gases during processing.

For brevity, in the appended claims the term "gasoline constituents" is to be understood to comprehend hydrocarbons boiling predominantly within the gasoline boiling range (90° F. to 400° F.), as well as slightly higher boiling hydrocarbons such as those normally occurring in hydrocarbon distillates of the nature of kerosene and light gas oil.

What I claim is:

1. The process of recovering gasoline constituents from gases occurring in a high pressure well of the gas distillate type, which comprises passing said gases upwardly through said well in intimate countercurrent contact with a descending flow of absorption medium to absorb from said gases a substantial proportion of their content of gasoline constituents, removing lean gases from contact with said absorption medium, removing absorption medium containing gasoline constituents from said well, and separating said gasoline constituents from said absorption medium.

2. The process of recovering gasoline constituents from gases occurring in a high pressure well of the gas distillate type, which comprises passing said gases upwardly through said well in intimate countercurrent contact with a descending flow of absorption medium to absorb from said gases a substantial proportion of their content of gasoline constituents, removing lean gases from contact with said absorption medium, returning lean gases to the gas-producing formation adjacent said well, removing absorption medium containing gasoline constituents from said well, and separating said gasoline constituents from said absorption medium.

3. The process as recited in claim 1, wherein the absorption medium is hydrocarbon oil.

4. The process of recovering gasoline constituents from gases occurring in a high pressure well of the gas distillate type, which comprises passing said gases upwardly through said well in intimate countercurrent contact with a descending flow of absorption medium to absorb from said gases a substantial proportion of their content of gasoline constituents, removing lean gases from contact with said absorption medium, recompressing said lean gases to a pressure greater than that of the gases issuing from the well, returning said recompressed gases to the gas-producing formation adjacent said well, removing absorption medium containing gasoline constituents from said well, and separating said gasoline constituents from said absorption medium.

5. The process of recovering gasoline constituents from gases occurring in a high pressure well of the gas distillate type, which comprises passing said gases upwardly through said well in intimate countercurrent contact with a descending flow of absorption medium to absorb from said gases a substantial proportion of their content of gasoline constituents, removing lean gases from contact with said absorption medium, returning lean gases to the gas-producing formation adjacent said well, removing absorption medium containing gasoline constituents from said well, separating said gasoline constituents from said absorption medium, and returning said absorption medium to said well for contacting additional quantities of gases.

OSCAR L. ROBERTS.